United States Patent
Bae (10) Patent No.: US 11,644,634 B2
(45) Date of Patent: May 9, 2023

(54) OPTICAL AXIS ALIGNMENT APPARATUS OF CAMERA MODULE

(71) Applicant: Furonteer Inc, Seongnam-si (KR)

(72) Inventor: Sang Shin Bae, Seoul (KR)

(73) Assignee: FURONTEER INC, Seongnam-si (KR)

( * ) Notice: Subject to any disclaimer, the term of this patent is extended or adjusted under 35 U.S.C. 154(b) by 351 days.

(21) Appl. No.: 17/005,907

(22) Filed: Aug. 28, 2020

(65) Prior Publication Data

US 2021/0080675 A1 Mar. 18, 2021

(30) Foreign Application Priority Data

Sep. 16, 2019 (KR) .................. 10-2019-0113522

(51) Int. Cl.
*G02B 7/00* (2021.01)
*G02B 7/02* (2021.01)

(52) U.S. Cl.
CPC ............. *G02B 7/005* (2013.01); *G02B 7/023* (2013.01)

(58) Field of Classification Search
CPC ......... G02B 7/005; G02B 7/023; G02B 27/62
See application file for complete search history.

(56) References Cited

FOREIGN PATENT DOCUMENTS

| JP | 2005-168054 A | 6/2005 | |
|---|---|---|---|
| KR | 10-2015-0120215 A | 10/2015 | |
| WO | WO2014141497 | * 9/2014 | ............. G02B 7/023 |

* cited by examiner

*Primary Examiner* — Joseph P Martinez

(74) *Attorney, Agent, or Firm* — Novick, Kim & Lee PLLC; Jae Youn Kim (57) ABSTRACT

Provided is an optical axis alignment apparatus of a camera module including a chart unit, a substrate alignment unit, an optical axis alignment unit and a control unit, and wherein the control unit calculates a principal point of the images for optical axis alignment by using the acquired plurality of images for optical axis alignment, and controls the substrate alignment unit or the optical axis alignment unit such that a center of the image sensor is located coaxially with the calculated principal point.

11 Claims, 7 Drawing Sheets

OPTICAL AXIS ALIGNMENT APPARATUS OF CAMERA MODULE

CROSS-REFERENCE TO RELATED APPLICATION

This application claims the benefit of Korean Patent Application No. 10-2019-0113522, filed on Sep. 16, 2019, in the Korean Intellectual Property Office, the disclosure of which is incorporated herein in its entirety by reference.

BACKGROUND

1. Field

One or more embodiments of the present disclosure relates to an optical axis alignment apparatus of a camera module.

2. Description of the Related Art

In a camera module, for example, a camera module mounted in a portable electronic device, high resolution and miniaturization of a mobile phone has lead to a gradual decrease in the number of pixels, and thus, an image quality is greatly deteriorated even by a slight optical axis distortion.

In addition, in a vehicle camera module, as the automatic parking function, lane detection function, and around view monitoring (AVM) are introduced, the distance to the actual object, the size and shape of the object, the matching rate with the driver's field of view, and the degree of image alignment between cameras are becoming very important.

In the case of AVM where multiple cameras are installed and images taken from each camera are pasted as a single image and provided to the driver, when the distortion of the top, bottom, left, and right of each camera screen is large, it is not easy to paste them as the single image and inaccurate image is generated.

SUMMARY

One or more embodiments include an optical axis alignment apparatus of a camera module, wherein the optical axis alignment apparatus aligns an optical axis such that there is no distortion of the top, bottom, left, and right of a screen in a camera, for example, a wide-angle camera.

Additional aspects will be set forth in part in the description which follows and, in part, will be apparent from the description, or may be learned by practice of the presented embodiments of the disclosure.

One embodiment of the present disclosure provides an optical axis alignment apparatus of a camera module including a chart unit providing an optical axis alignment image to the substrate assembly including an image sensor, a substrate alignment unit disposed opposite to the chart unit, aligning the substrate assembly, and electrically connected to the image sensor, an optical axis alignment unit provided for optical axis alignment of a lens assembly with respect to the image sensor, wherein the lens assembly includes a lens and an actuator, and a control unit controlling the substrate alignment unit or the optical axis alignment unit, wherein the image sensor sequentially acquires a plurality of images for optical axis alignment having different directions or angles, and wherein the control unit calculates a principal point of the optical axis alignment image by using the acquired plurality of images for optical axis alignment, and controls the substrate alignment unit or the optical axis alignment unit in such a way that a center of the image sensor is located coaxially with the calculated principal point.

In an embodiment of the present disclosure, the optical axis alignment apparatus of the camera module may further include a first angle adjustment unit adjusting a first angle of the chart unit that is an angle with respect to a first direction based on the center of the chart unit.

In an embodiment of the present disclosure, the substrate alignment unit may include a seating part for seating the substrate assembly and a rotating part for rotating the seating part about a central axis passing through the seating part and the image sensor.

In an embodiment of the present disclosure, the optical axis alignment apparatus of the camera module may further include a linear motion unit that linearly moves the substrate alignment unit in one direction.

In an embodiment of the present disclosure, the substrate alignment unit may include a stage on which the seating part is disposed, and the optical axis alignment unit is disposed on the stage, and is rotated together with the seating part by the rotating part.

In an embodiment of the present disclosure, the optical axis alignment apparatus of the camera module may further include a second angle adjustment unit adjusting a second angle of the chart unit that is an angle with respect to a second direction crossing the first direction based on the center of the chart unit.

In an embodiment of the present disclosure, the optical axis alignment apparatus of the camera module may further include a linear motion unit that linearly moves the substrate alignment unit in one direction.

In an embodiment of the present disclosure, the substrate alignment unit includes a seating part for seating the substrate assembly and a stage on which the seating part is disposed, and the optical axis alignment unit is disposed on the stage and may be transferred together with the substrate alignment unit.

In an embodiment of the present disclosure, the substrate alignment unit may include a seating part seating the substrate assembly and a swing part moving the seating part in such a way that a central axis passing through the seating part and the image sensor is inclined at a preset angle with respect to the chart unit.

In an embodiment of the present disclosure, the substrate alignment unit further includes a stage on which the seating part is disposed, and the optical axis alignment unit is disposed on the stage and may move together with the seating part by the swing part.

In an embodiment of the present disclosure, the optical axis alignment apparatus of the camera module may further include a linear motion unit that linearly moves the substrate alignment unit in a first direction or a second direction perpendicular to the first direction.

Other aspects, features, and advantages than those described above will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The embodiments will be described below in more detail with reference to the accompanying drawings. Those components that are the same or are in correspondence are rendered the same reference numeral regardless of the figure number, and redundant explanations are omitted.

The embodiments may have various transformations, and specific embodiments are illustrated in the drawings and are described in detail in the detailed description. Effects and features of the embodiments, and methods of achieving the same will be clarified through the following description in detail with reference to the drawings. However, the present disclosure is not limited to the embodiments disclosed below, but may be implemented in various forms.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including," "having," and "comprising" are intended to indicate the existence of the features or components disclosed in the specification, and are not intended to preclude the possibility that one or more other features or components may exist or may be added.

In the following embodiments, when a part, such as a unit, a region, or a component, is referred to as being connected to another unit, region, or component, it can be directly or indirectly connected to the other unit, region, or component. That is, for example, intervening units, regions, or components may be present.

In the following embodiments, terms such as 'connect' or 'couple' do not necessarily mean direct and/or fixed connection or coupling of two members unless the context clearly indicates otherwise. That is, these terms do not exclude the intervening of other members between the two members.

It means that the features or components described in the specification exist, and does not preclude the possibility of adding one or more other features or components in advance.

In the drawings, the size of components may be exaggerated or reduced for convenience of description. For example, since the size and thickness of each component shown in the drawings are arbitrarily shown for convenience of description, the following embodiments are not necessarily limited to those illustrated.

Figure 1:
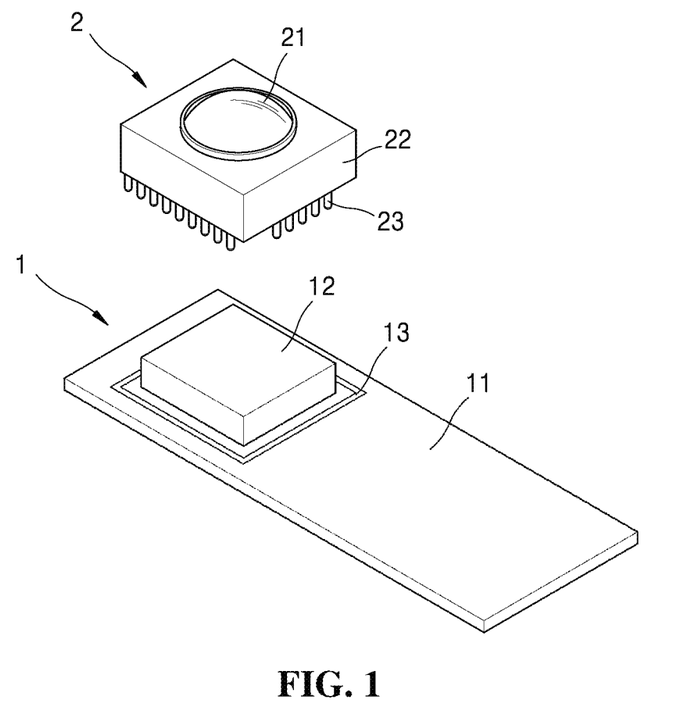
FIG. 1 shows an exploded perspective view of an embodiment of a camera module in which an optical axis may be aligned by an optical axis alignment apparatus of a camera module according to an embodiment of the present disclosure.

FIG. 1 is an exploded perspective view of an embodiment of a camera module in which an optical axis may be aligned by an optical axis alignment apparatus 100 of a camera module according to an embodiment of the present disclosure.

Referring to FIG. 1, an example of a camera module may be a camera module for a mobile, a personal computer (PC) and/or a vehicle, and may include a substrate assembly 1 and a lens assembly 2.

The substrate assembly 1 may have a structure in which an image sensor 12 is coupled on a printed circuit board (PCB) substrate 11 on which a conductive wiring pattern is formed.

The lens assembly 2 may include an actuator 22 and a lens 21 accommodated therein, and the actuator 22 may include an electrode pin 23 electrically connected to at least the PCB substrate 11 and/or the image sensor 12. The actuator 22 may include an autofocus actuator and/or an image stabilization actuator, and the autofocus actuator and the image stabilization actuator may be integrally provided.

An adhesive 13 may be applied around the image sensor 12 on the PCB substrate 11, and the lens assembly 2 may be bonded and fixed by the adhesive 13 applied on the PCB substrate 11 in a state of optical axis alignment with the image sensor 12.

The optical axis alignment apparatus 100 of the camera module of the present disclosure is not necessarily applied only to the optical axis alignment of the camera module, and may be applied to align the optical axis of various other types of a camera module.

Figure 2:
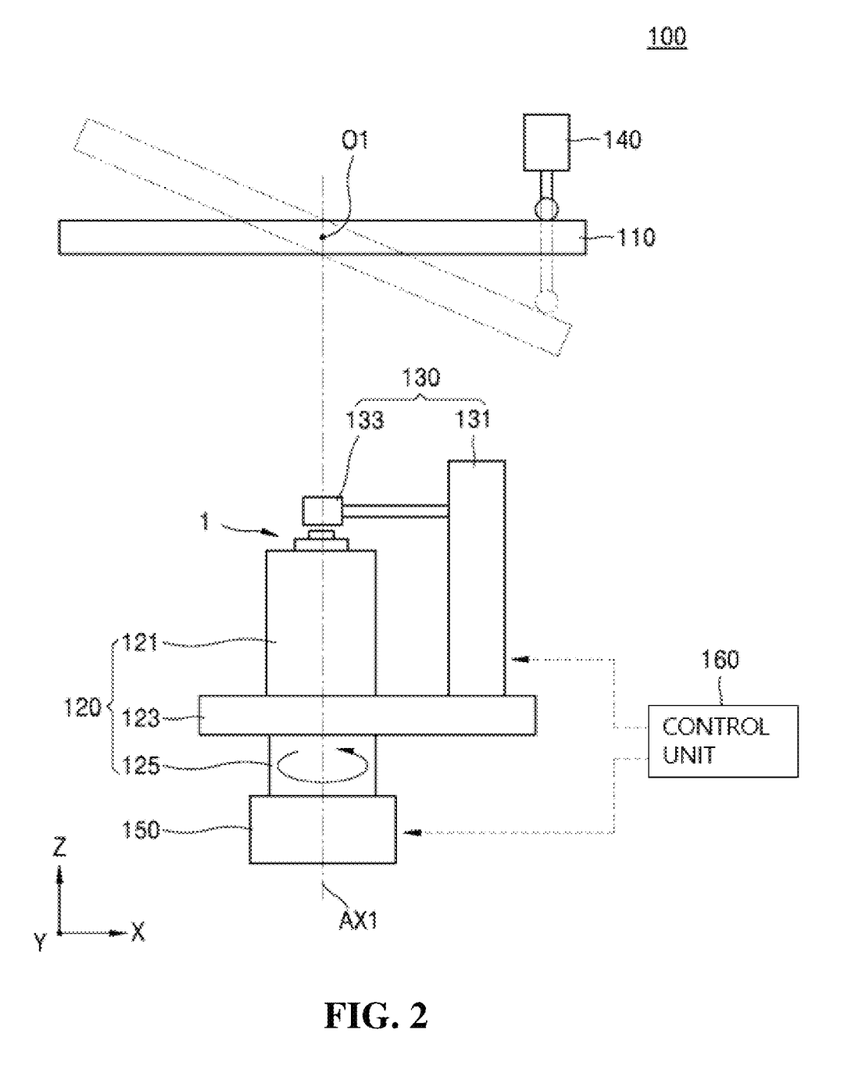
FIG. 2 shows a schematic view showing the configuration of an embodiment of the optical axis alignment apparatus of the camera module for aligning a substrate assembly and an optical axis of a lens assembly Illustrated in FIG. 1.
Figure 3:
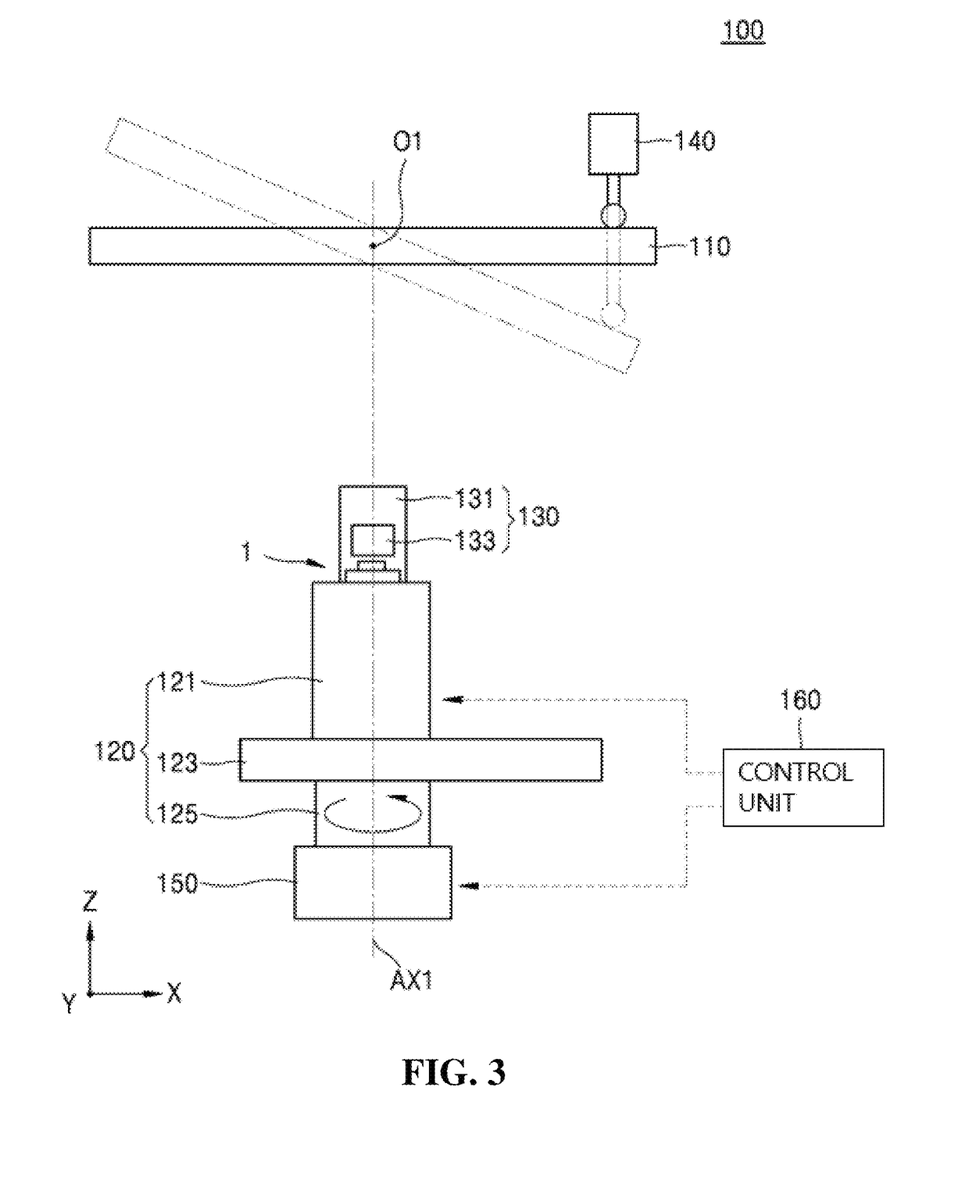
FIG. 3 shows a view showing a state in which a substrate alignment unit of the optical axis alignment apparatus of the camera module illustrated in FIG. 2 is rotated.
Figure 4:
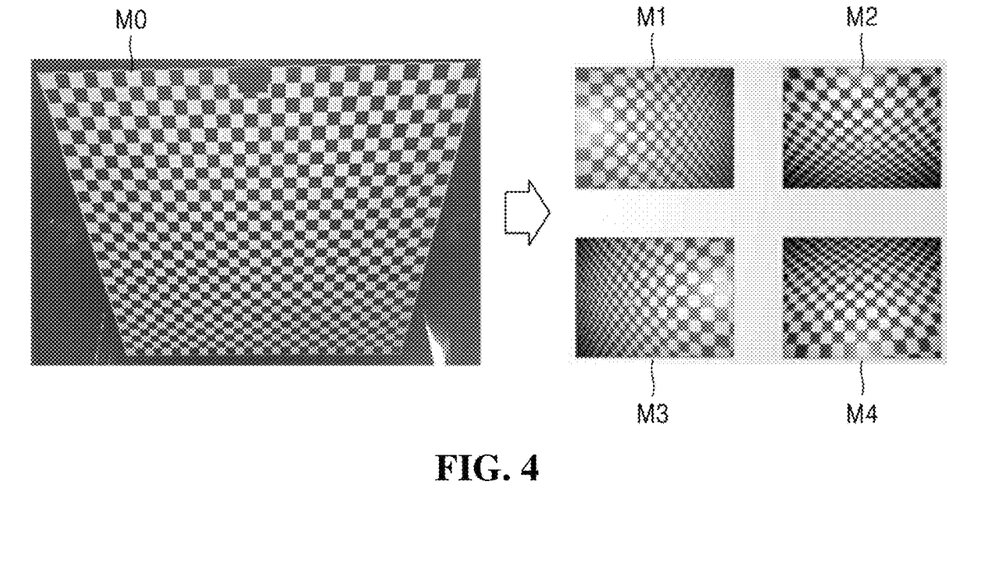
FIG. 4 shows a view for explaining an optical axis alignment method of an optical axis alignment apparatus of a camera module according to an embodiment of the present disclosure.

FIG. 2 is a schematic view showing the configuration of the embodiment of the optical axis alignment apparatus 100 of the camera module for aligning the substrate assembly 1 and the optical axis of a lens assembly 2 Illustrated in FIG. 1, and FIG. 3 is a view showing a state in which the substrate alignment unit 120 of the optical axis alignment apparatus 100 of the camera module illustrated in FIG. 2 is rotated. FIG. 4 is a view for explaining an optical axis alignment method of the optical axis alignment apparatus 100 of a camera module according to an embodiment of the present disclosure.

Referring to FIGS. 2 to 4, the optical axis alignment apparatus 100 of the camera module according to an embodiment of the present disclosure includes a chart unit 110, a substrate alignment unit 120, an optical axis alignment unit 130, and a control unit 160. In addition, the optical axis alignment apparatus 100 of the camera module may further include a first angle adjustment unit 140 and a linear motion unit 150.

In aligning the optical axis of the lens assembly 2 and the substrate assembly 1 including the image sensor 12 using the chart unit 110, the optical axis alignment apparatus 100 of the camera module according to an embodiment of the present disclosure sequentially acquires a plurality of images for optical axis alignment M1, M2, M3, and M4 with different directions or angles, and aligns the optical axis of the camera module using the acquired images for optical axis alignment M1, M2, M3, and M4.

In an embodiment, the technical concept of the optical axis alignment apparatus 100 of the camera module according to an embodiment of the present disclosure is to calculate the position of a principal point of an image through a calibration method using an intrinsic parameter, and is to align the optical axis such that the principal point is positioned at a center of the image sensor.

Hereinafter, the configuration of the optical axis alignment apparatus 100 of the camera module according to an embodiment of the present disclosure will be described in more detail in order to implement the above technical concept.

The chart unit 110 may provide the optical axis alignment image M0 to the substrate assembly 1 including the image sensor 12. The chart unit 110 may include at least a light source and an inspection chart, so that the lens of lens assembly 2 and the optical axis of image sensor 12 may be aligned. That is, when the light source, the inspection chart, lens, and the image sensor are sequentially arranged from top to bottom, the image sensor 12 senses the image of the inspection chart that has passed through the lens, and discriminates whether the optical axis of the lens and image sensor 12 are aligned. In an optional embodiment, a collimator lens may be interposed between the inspection chart and the lens assembly 2 to narrow a distance between the inspection chart and the lens assembly 2.

At this time, a center O1 of the chart unit 110 may be rotatably formed on the top of the substrate alignment unit 120 in such a way that the chart unit 110 may tilt clockwise and counterclockwise around Y-axis.

Meanwhile, the first angle adjustment unit 140 may adjust a first angle of the chart unit 110 with respect to the first direction (X-axis direction) based on the center O1 of the chart unit 110. The first angle adjustment unit 140 may be connected to one side of the chart unit 110 while spaced a certain distance from the center O1 of the chart unit 110, as illustrated, and may tilt the chart unit 110 at a predetermined angle by pushing or pulling the one side of the chart unit 110 according to the control of the control unit 160. In other words, the first angle adjustment unit 140 may tilt a right side of the chart unit 110 downward based on FIGS. 2 and 3 by pushing the chart unit 110, and may tilt the right side of the chart unit 110 upward by pulling the chart unit 110. By doing so, the image sensor 12 of the substrate assembly 1 may acquire two images for optical axis alignment with different angles in the first direction (X-axis direction).

As an embodiment, the first angle adjustment unit 140 may include a connection part 141 connected to the chart unit 110 and a length adjustment part 143 for adjusting the length of the connection part 141. Here, the length adjustment part 143 is provided with a pneumatic or hydraulic actuator to adjust the length of the connection part 141 connected to the chart unit 110, so that the first angle adjustment unit 140 may push or pull the chart unit 110.

Meanwhile, the substrate alignment unit 120 is disposed to face the chart unit 110, aligns the substrate assembly 1, and may be electrically connected to the image sensor 12. The substrate alignment unit 120 may include a seating part 121 on which the substrate assembly 1 is seated. The seating part 121 may be provided with the substrate assembly 1 seated on an upper surface thereof, and may include a terminal part (not illustrated) so as to be in contact with the substrate assembly 1 which is seated and to be electrically connected to the image sensor 12. At this time, the terminal part (not illustrated) is electrically connected to a power supply and the control unit 160, and transmits the image acquired through the image sensor 12 to the control unit 160.

In addition, although not illustrated, the seating part 121 may include a driving part (not illustrated) for x-axis movement (X), y-axis movement (Y), r-axis rolling (R), and tilting (yawing Tx and pitching Ty) so as to align the position of the substrate assembly 1 seated on the upper surface. The seating part 121 may perform the function of finely aligning the position of the substrate assembly 1 by the driving part (not illustrated).

In an optional embodiment, the optical axis alignment apparatus 100 of the camera module may further include a linear motion unit 150 linearly moving the substrate alignment unit 120 in one direction (Y-axis direction). The linear motion unit 150 may include a guide rail (not illustrated) guiding a movement of the substrate alignment unit 120. By doing so, when the substrate assembly 1 is seated on the substrate alignment unit 120 at a predetermined position, the linear motion unit 150 linearly moves the substrate alignment unit 120 in one direction (Y-axis direction) to align the optical axis and may position the same below the chart unit 110.

In an embodiment, the substrate alignment unit 120 may further include a rotating part 125 rotating the seating part 121 based on a central axis AX1 passing through the seating part 121 and the image sensor 12. At this time, unlike the driving part of the seating part 121 that finely adjusts the position of the substrate assembly 1, the rotating part 125 may rotate the image sensor 12 of the substrate assembly 1 by 90° by rotating the seating part 121 by 90°. By doing so, even though the first angle adjustment unit 140 equally adjusts the angle of the chart unit 110 with respect to the first direction (X-axis direction), the image sensor 12 may acquire an image while being rotated by 90°, so that a plurality of images for optical axis alignment with different angles and directions may be obtained.

Meanwhile, the optical axis alignment unit 130 may be provided to proceed optical axis alignment of the lens assembly 2 including a lens and an actuator with respect to the image sensor 12. In other words, the optical axis alignment unit 130 may proceed optical axis alignment of the lens assembly 2 with respect to the image sensor 12 of the substrate assembly 1, and then form a camera module with the lens assembly 2 coupled to the substrate assembly 1. The optical axis alignment unit 130 may include a gripper 133 gripping the lens assembly 2 and a gripper driving part 131 driving the gripper 133 to align the position of the lens assembly 2. In an embodiment, as described above, when the substrate alignment unit 120 is provided with the driving part (not illustrated) for x-axis movement, y-axis movement, r-axis rolling, tilting (yawing Tx and pitching Ty) to align the position of the substrate assembly 1, the gripper driving part 131 may perform a z-axis movement of the gripper 133 so that the lens assembly 2 is coupled to the substrate assembly 1.

However, the present disclosure is not limited to the above-described configuration, and the optical axis alignment unit 130 may perform not only the z-axis movement of the lens assembly 2, but also the x-axis movement, y-axis movement, r-axis rolling and tilting (yawing Tx and pitching Ty) to align the optical axis of the lens to the optical axis of the image sensor 12.

Here, the optical axis alignment unit 130 may rotate with respect to the same axis, for example, the central axis AX1, together with the substrate alignment unit 120, in correspondence to the rotation of the substrate alignment unit 120. Since the optical axis alignment unit 130 aligns the optical axis while gripping the lens assembly 2 and then performs the function of coupling to the substrate assembly 1, the optical axis alignment unit 130 gripping the lens assembly 2 may also be rotated by 90° in correspondence to the 90° rotation of the substrate assembly 1. For this, the substrate alignment unit 120 may further include a stage 123 on which the seating part 121 is disposed, and the optical axis alignment unit 130 may be disposed on the stage 123 and may be rotated together with the seating part 121 by the rotating part 125.

The control unit 160 may calculate the principal point of the optical axis alignment image by using the plurality of images for optical axis alignment acquired by the image sensor 12, and control the substrate alignment unit 120 or optical axis alignment unit 130 in such a way that the center of the image sensor 12 and the calculated principal point are located on the same axis.

As described above, the optical axis alignment apparatus 100 of the camera module may calculate the position of the principal point of the image by a calibration method using an intrinsic parameter.

In one or more embodiments, a camera module, for example, a wide-angle camera module should be manufactured not to cause the deviation of the distortion of the top, bottom, left, and right of the screen. To this end, a function of aligning the lens and a XY optical axis of the image sensor 12 based on a geometrical optical axis is required. In the present disclosure, in order to align the optical axis of the image sensor 12 with respect to the geometrical optical axis, feature points of the plurality of images for optical axis alignment are extracted, and the intrinsic parameter is extracted based on image coordinates or physical coordinates for the feature points, and the position of the principal point of the image may be calculated from the intrinsic parameter.

In this regard, the image coordinates are pixel coordinates for the extracted feature points, and may correspond to values that vary according to a plurality of images for optical axis alignment with different angles or directions.

In this case, the physical coordinates may be coordinates corresponding to one of a relative coordinate system using any one of the extracted feature points as an origin or a world coordinate system based on a separate external origin. However, even when the physical coordinates are set based on either the relative coordinate system or the world coordinate system, there is no effect on the calculation of the intrinsic parameter. Accordingly, a preset coordinate system may be used.

Meanwhile, the image coordinates and the physical coordinates may be converted by Equation 1 below, and the intrinsic parameter may be extracted from Equation 1.

$$s\begin{bmatrix} x \\ y \\ 1 \end{bmatrix} = \begin{bmatrix} f_x & \text{skew\_cf} & c_x \\ 0 & f_y & c_y \\ 0 & 0 & 1 \end{bmatrix} \begin{bmatrix} r_{11} & r_{12} & r_{13} & t_1 \\ r_{21} & r_{21} & r_{23} & t_2 \\ r_{31} & r_{32} & r_{33} & t_3 \end{bmatrix} \begin{bmatrix} X \\ Y \\ Z \\ 1 \end{bmatrix} = A[R|t]\begin{bmatrix} X \\ Y \\ Z \\ 1 \end{bmatrix}$$ [Equation 1]

In Equation 1, $f_x$ and $f_y$ represent a focal length of the camera module, and Cx and Cy represent the principal point.

The control unit 160 may calculate the principal point of the image by using the intrinsic parameter, and control the substrate alignment unit or optical axis alignment unit in such a way that the center of the calculated principal point of the image and the center of the image sensor are located on the same axis, and align the optical axis and then couple the lens assembly 2 to the substrate assembly 1.

Figure 5:
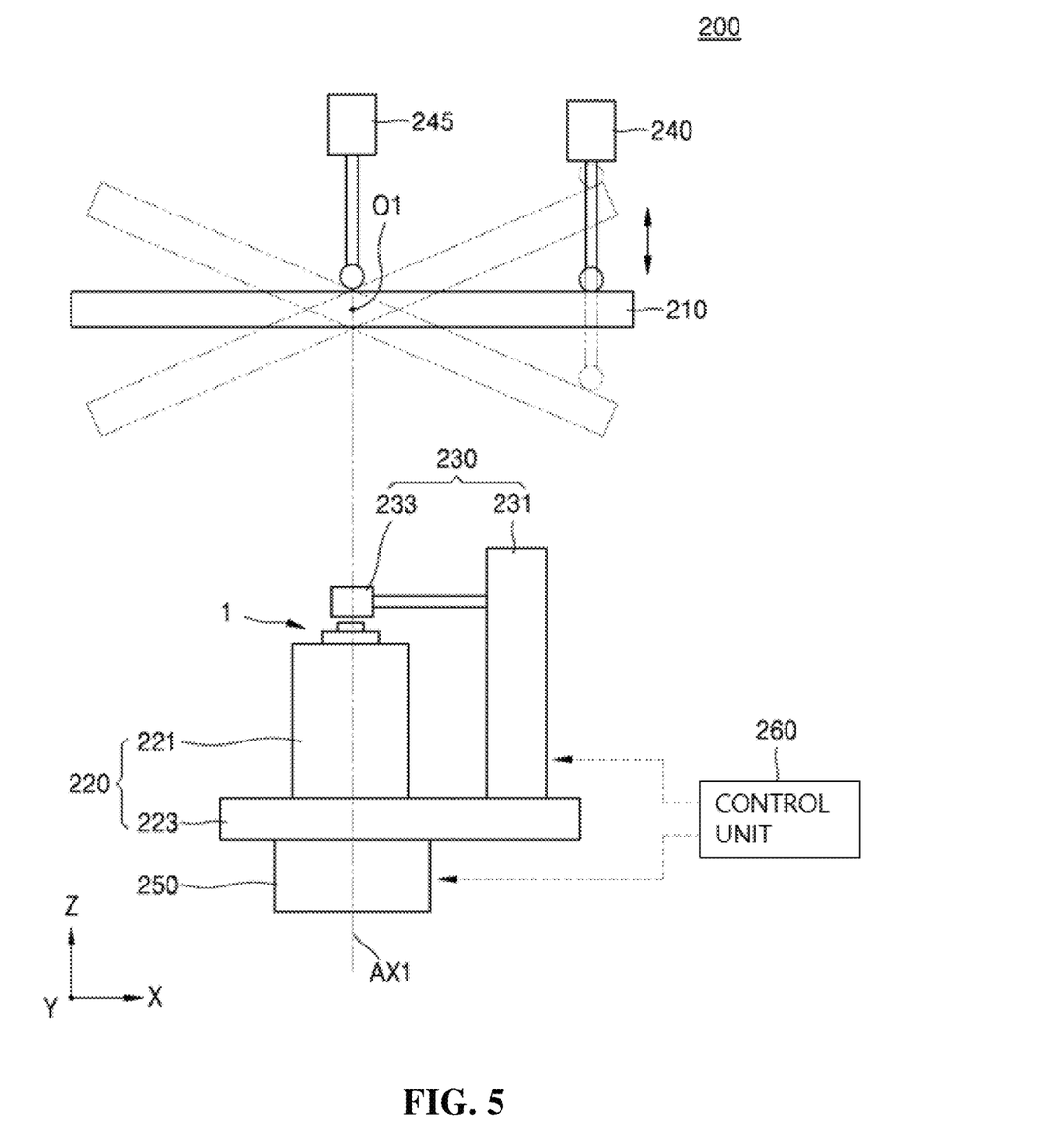
FIG. 5 shows a schematic view to explain an optical axis alignment apparatus of a camera module according to another embodiment of the present disclosure.
Figure 6:
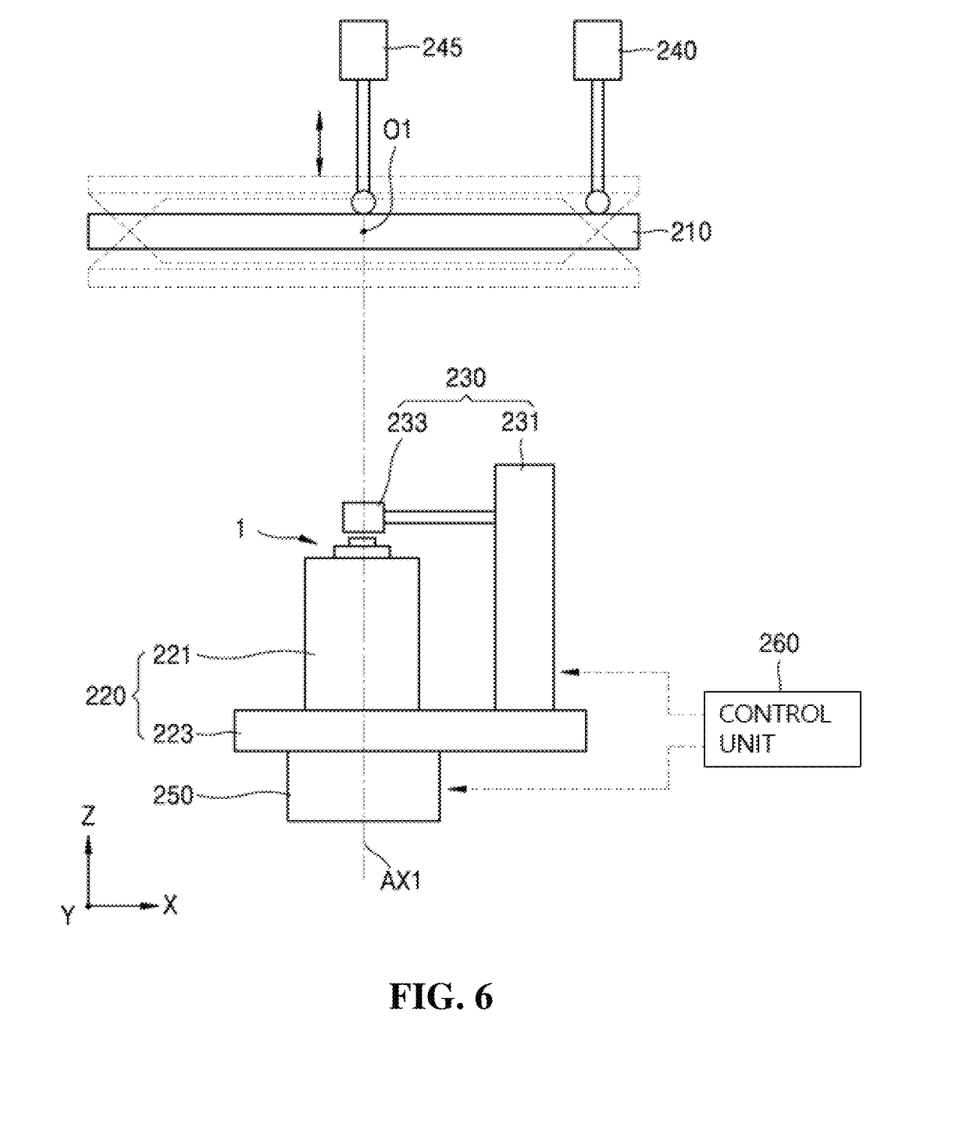
FIG. 6 shows a view for explaining a method of obtaining an optical axis alignment image in a different direction by a second angle adjustment unit illustrated in FIG. 5.

FIG. 5 is a schematic view to explain an optical axis alignment apparatus 200 of a camera module according to another embodiment of the present disclosure, and FIG. 6 is a view for explaining a method of obtaining an optical axis alignment image in a different direction by a second angle adjustment unit 245 illustrated in FIG. 5. Since the optical axis alignment apparatus 200 of the camera module according to another embodiment has the same technical concept as the optical axis alignment apparatus 100 of the camera module according to an embodiment, a redundant description will be omitted.

Referring to FIGS. 5 and 6, the optical axis alignment apparatus 200 of the camera module according to another embodiment may include a chart unit 210, a substrate alignment unit 220, an optical axis alignment unit 230, a control unit 260, a first angle adjustment unit 240, a linear motion unit 250 and a second angle adjustment unit 245.

The chart unit 210 may provide the optical axis alignment image M0 to the substrate assembly 1 including the image sensor 12.

As illustrated in FIG. 5, the first angle adjustment unit 240 may adjust a first angle of the chart unit 210 with respect to a first direction (X-axis direction) based on a center O1 of the chart unit 210. The first angle adjustment unit 240 may be connected to one side of the chart unit 210 while spaced a certain distance from the center O1 of the chart unit 210, as illustrated, and may tilt the chart unit 210 at a preset angle by pushing or pulling the one side of the chart unit 210 according to the control of the control unit 260. In other words, the first angle adjustment unit 240 may tilt a right side of the chart unit 210 downward based on FIG. 5 by pushing the chart unit 210, and may tilt the right side of the chart unit 210 upward by pulling the chart unit 210. By doing so, the image sensor 12 of the substrate assembly 1 may acquire two images for optical axis alignment with different angles in the first direction (X-axis direction).

On the other hand, as illustrated in FIG. 6, the second angle adjustment unit 245 may adjust a second angle of the chart unit 210 with respect to a second direction (Y-axis direction) crossing the first direction (X-axis direction) based on the center O1 of the chart unit 210. In one or more embodiments, the second angle adjustment unit 245 may adjust a second angle of the chart unit 210 with respect to the second direction (Y-axis direction) perpendicular to the first direction (X-axis direction). At this time, the second angle adjustment unit 245 may be connected to the chart unit 210 at a position that is on the extension line of the Y axis. Like the first angle adjustment unit 240, the second angle adjustment unit 245 may tilt the chart unit 210 at a preset angle by pushing or pulling the other side of the chart unit 210. By doing so, the image sensor 12 of the substrate assembly 1 may acquire two images for alignment with different angles in the second direction (Y-axis direction).

The second angle adjustment unit 245, like the first angle adjustment unit 240, may include a connection part connected to the chart unit 210 and a length adjustment part for adjusting the length of the connection part. Here, the length adjustment part is provided with a pneumatic or hydraulic actuator to adjust the length of the connection part connected to the chart unit 210, so that the second angle adjustment unit 245 may push or pull the chart unit 210.

Therefore, unlike the previous embodiments, the optical axis alignment apparatus 200 of the camera module according to another embodiment does not need to rotate the seating part 221 of the substrate alignment unit 220 relative to a central axis AX1, and may omit a configuration of a rotating part.

Meanwhile, the optical axis alignment apparatus 200 of the camera module may further include the linear motion unit 250 that linearly moves the substrate alignment unit 220 in one direction (Y-axis direction). In addition, the substrate alignment unit 220 may further include a stage 223 on which the seating part 221 is disposed, and the optical axis alignment unit 230 may be disposed on the stage 223 and transferred together with the substrate alignment unit 220.

Figure 7:
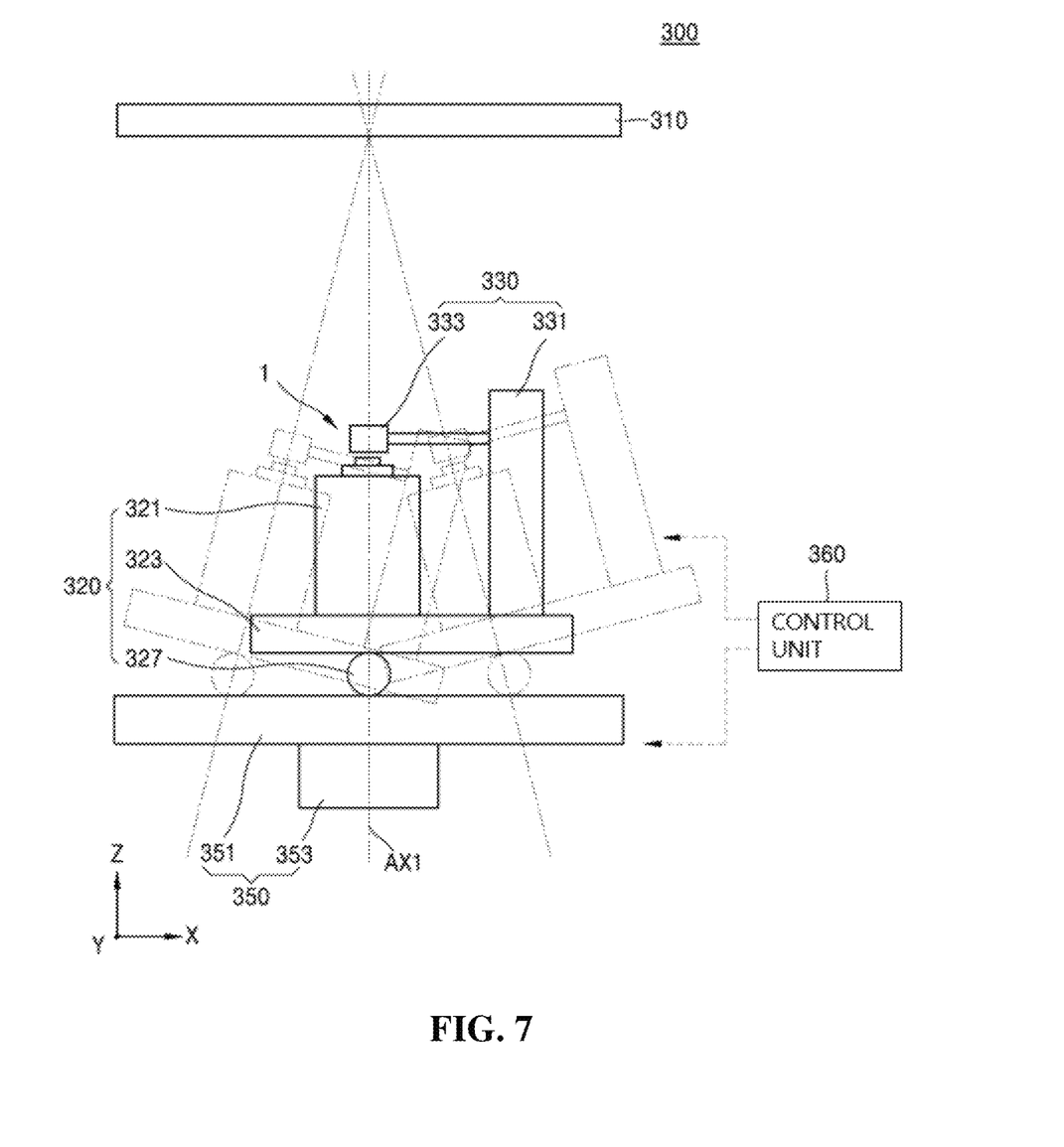
FIG. 7 shows a conceptual view for explaining an optical axis alignment apparatus of a camera module according to another embodiment of the present disclosure.

FIG. 7 is a conceptual view for explaining an optical axis alignment apparatus 300 of a camera module according to another embodiment of the present disclosure.

Referring to FIG. 7, the optical axis alignment apparatus 300 of the camera module according to another embodiment of the present disclosure may include a chart unit 310, a substrate alignment unit 320, an optical axis alignment unit 330, a control unit 360 and a linear motion unit 350.

The chart unit 310 may provide the optical axis alignment image M0 to the substrate assembly 1 including the image sensor 12.

The substrate alignment unit 320 may be disposed opposite the chart unit 310, align the substrate assembly 1, and be electrically connected to the image sensor 12. The substrate alignment unit 320 may include a seating part 321 for seating the substrate assembly 1 and a swing part 327 moving the seating part 321 in such a way that the central axis AX1 passing through the seating part 321 and the image sensor 12 is inclined at a certain angle with respect to the chart unit 310.

The seating part 321 may be provided with the substrate assembly 1 seated on an upper surface thereof, and may include a terminal part (not illustrated) that contacts the seated substrate assembly 1 and is electrically connected to the image sensor 12. At this time, the terminal part (not illustrated) is electrically connected to a power supply and the control unit 360, and transmits the image acquired through the image sensor 12 to the control unit 360.

The swing part 327 may be connected to the seating part 321, and may move the seating part 321 in such a way that the central axis AX1 of the seating part 321 swings in a first direction (X-axis direction) or a second direction (Y-axis direction) with respect to the center O1 of the chart unit 310. For example, the swing part 327 includes a driving wheel connected to a lower portion of the seating part 321, and, due to the rotation of the driving wheel relative to a rotation axis of the driving wheel, the central axis AX1 of the seating part 321 may be swung. Further, the swing part 327 may be formed as a ball-shaped driving wheel for a swing motion in the first direction (X-axis direction) or the second direction (Y-axis direction).

In the optical axis alignment apparatus 300 of the camera module according to another embodiment, without adjusting the angle of the chart unit 310, the image sensor 12 may acquire the plurality of images for optical axis alignment having different angles or directions by controlling the movement of the seating part 321 of the substrate alignment unit 320.

Meanwhile, the optical axis alignment apparatus 300 of the camera module may further include the linear motion unit 350 that linearly moves the substrate alignment unit 320 in the first direction (X-axis direction) or the second direction (Y-axis direction) perpendicular to the first direction (X-axis direction). In addition, the substrate alignment unit 320 may further include a stage 323 on which the seating part 321 is disposed, and the optical axis alignment unit 330 may be disposed on the stage 323 and moved together with the seating part 321 by the swing part 327.

As described above, the optical axis alignment apparatus of the camera module according to embodiments of the present disclosure adjusts the direction or angle of the chart unit, or controls the movement of the substrate alignment unit opposite to the chart unit, thereby obtaining a plurality of images for optical axis alignment to calculate intrinsic parameters. In addition, the optical axis alignment apparatus of the camera module calculates the principal point of the image obtained by using the intrinsic parameters, and aligns the optical axis in such a way that the position of the principal point of the image is located at the center of the image sensor, thereby realizing optimal focusing of the center of the image, a uniform resolution balance on the outer periphery of the image and minimizing image distortion.

Optical axis alignment apparatus of a camera module according to embodiments of the present disclosure adjust the direction or angle of a chart unit, or control the movement of a substrate alignment unit opposite to the chart unit, thereby obtaining a plurality of images for optical axis alignment to calculate intrinsic parameters. In addition, optical axis alignment apparatus of a camera module calculate the principal point of the image from the intrinsic parameters, and align the optical axis such that the position of the principal point of the image is in the center of the image sensor, thereby realizing optimal focusing of the center of the image, a uniform resolution balance on the outer periphery of the image, and minimizing image distortion.

Hereinbefore, the present disclosure has been focused on preferred embodiments. Those skilled in the technical field to which the present disclosure belongs may implement the present disclosure in a modified form without departing from the essential characteristics of the present disclosure. Therefore, the embodiments disclosed above should be considered in terms of explanation, not limitation. The scope of the present disclosure is shown in the claims rather than the foregoing description, and all differences within the equivalent range should be interpreted as being included in the present disclosure.

What is claimed is:

1. An optical axis alignment apparatus of a camera module, comprising:
   a chart unit providing an optical axis alignment image to a substrate assembly including an image sensor;
   a substrate alignment unit disposed opposite to the chart unit, aligning the substrate assembly, and electrically connected to the image sensor;
   an optical axis alignment unit provided for optical axis alignment of a lens assembly with respect to the image sensor, wherein the lens assembly includes a lens and an actuator; and
   a control unit controlling the substrate alignment unit or the optical axis alignment unit,
   wherein the image sensor sequentially acquires a plurality of images for optical axis alignment having different directions or angles, and
   wherein the control unit calculates a principal point of the images for optical axis alignment by using the acquired images for optical axis alignment and controls the substrate alignment unit or the optical axis alignment unit in such a way that a center of the image sensor is located coaxially with the calculated principal point, wherein the substrate alignment unit includes a seating part for seating the substrate assembly and a rotating part for rotating the seating part about a central axis passing through the seating part and the image sensor.

2. The optical axis alignment apparatus of claim 1, further comprising a first angle adjustment unit adjusting a first angle of the chart unit that is an angle with respect to a first direction based on the center of the chart unit.

3. The optical axis alignment apparatus of claim 2, further comprising a second angle adjustment unit adjusting a second angle of the chart unit that is an angle with respect to a second direction crossing the first direction based on the center of the chart unit.

4. The optical axis alignment apparatus of claim 3, further comprising a linear motion unit that linearly moves the substrate alignment unit in one direction.

5. The optical axis alignment apparatus of claim 1, further comprising a linear motion unit that linearly moves the substrate alignment unit in one direction.

6. The optical axis alignment apparatus of claim 5, wherein the substrate alignment unit includes a stage on which the seating part is disposed, and wherein the optical axis alignment unit is disposed on the stage, and is rotated together with the seating part by the rotating part.

7. An optical axis alignment apparatus of a camera module, comprising:

a chart unit providing an optical axis alignment image to a substrate assembly including an image sensor;

a substrate alignment unit disposed opposite to the chart unit, aligning the substrate assembly, and electrically connected to the image sensor;

an optical axis alignment unit provided for optical axis alignment of a lens assembly with respect to the image sensor, wherein the lens assembly includes a lens and an actuator; and a control unit controlling the substrate alignment unit or the optical axis alignment unit, wherein the image sensor sequentially acquires a plurality of images for optical axis alignment having different directions or angles, and wherein the control unit calculates a principal point of the images for optical axis alignment by using the acquired images for optical axis alignment and controls the substrate alignment unit or the optical axis alignment unit in such a way that a center of the image sensor is located coaxially with the calculated principal point, wherein the substrate alignment unit includes a seating part seating the substrate assembly and a swing part moving the seating part in such a way that a central axis passing through the seating part and the image sensor is inclined at a certain angle with respect to the chart unit.

8. The optical axis alignment apparatus of claim 7, wherein the substrate alignment unit further comprises a stage on which the seating part is disposed, and wherein the optical axis alignment unit is disposed on the stage, and moves together with the seating part by the swing part.

9. The optical axis alignment apparatus of claim 7, further comprising a linear motion unit that linearly moves the substrate alignment unit in a first direction or a second direction perpendicular to the first direction.

10. The optical axis alignment apparatus of claim 9, further comprising a second angle adjustment unit adjusting a second angle of the chart unit that is an angle with respect to a second direction crossing the first direction based on the center of the chart unit.

11. The optical axis alignment apparatus of claim 7, further comprising a first angle adjustment unit adjusting a first angle of the chart unit that is an angle with respect to a first direction based on the center of the chart unit.

* * * * *